Nov. 15, 1960  R. L. BENSON  2,960,222
APPARATUS FOR SEPARATING FINE AND COARSE PARTICLES
Filed Jan. 12, 1956  2 Sheets-Sheet 1
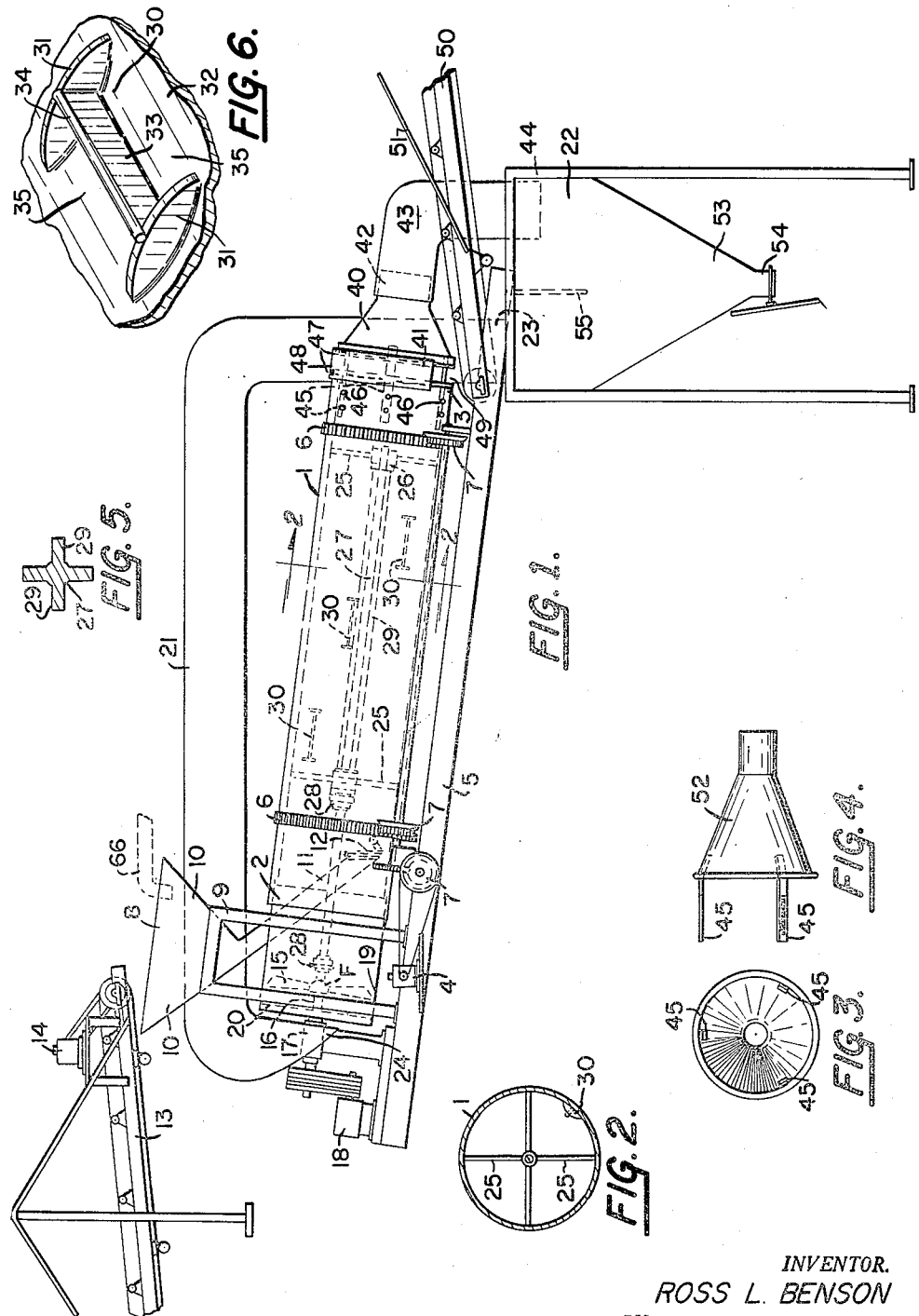
INVENTOR.
ROSS L. BENSON
BY Philip H. Sheridan
ATTORNEY Nov. 15, 1960  R. L. BENSON  2,960,222
APPARATUS FOR SEPARATING FINE AND COARSE PARTICLES
Filed Jan. 12, 1956  2 Sheets-Sheet 2

INVENTOR.
ROSS L. BENSON
BY
Philip H. Sheridan
ATTORNEY

United States Patent Office 2,960,222
Patented Nov. 15, 1960

2,960,222

APPARATUS FOR SEPARATING FINE AND COARSE PARTICLES

Ross L. Benson, 695 10th St., Boulder, Colo.

Filed Jan. 12, 1956, Ser. No. 558,639

16 Claims. (Cl. 209—17)

This invention relates to a separator for separating fine particles from coarse and rock-like particles and more specifically to a uranium upgrader particularly constructed to separate dust which carries the uranium values from the remaining ore particles and yet which may be easily converted for wet separation of the valuable ore particles.

It is to be understood that this invention has utility as a dry or wet separator, particularly the former, in connection with the separating of various products, such as any type of dust from rock and gravel. However, the principal aim of the invention is to provide a separator constructed to upgrade ore, particularly uranium ore, so that it is marketable. As is well known, there are many deposits of low grade ore and by this is meant deposits containing, for example, .05 to .08 of one percent of uranium. To make such ore marketable it is necessary to increase this percentage to the vicinity of .3 of one percent and it is the principal object of this invention to provide an improved separator for wet or dry operations which will accomplish this result.

Another object of the invention is to provide a separator particularly useful for separating dust from ore materials, the amount of separation being controlled by the type of separator head employed, by the agitation of the ore within the separator and by the speed of travel of the ore through the separator.

A further object of the invention is to provide a separator of the type set forth in the previous paragraph which may be readily converted from dry operation to that of wet operation by substituting the minimum number of parts and resulting in the valuable ore products being recovered in the form of slime instead of dust.

A further object of the invention is to provide a separator particularly useful for separating fine dust particles which is constructed to permit interchanging of separator heads, depending upon the degree of fineness desired of the dust particle.

Yet another object is to provide a plurality of specially constructed separator heads usable interchangeably in the separator, depending upon wet or dry operation and the fineness desired of the dust particles in dry separation.

It is also an object of this invention to provide a separator of the type described including improved agitating means for the dry or wet ore particles.

Other objects of the invention will become apparent upon considering the drawings wherein like numerals represent similar parts throughout and wherein:

Figure 1 is an overall diagrammatic view of the dry separator of this invention including the dust collecting chamber and means for feeding ore to the separator;

Figure 2 is a sectional view taken along the lines 2—2 of Figure 1;

Figure 3 is an end view of one form of separator head;

Figure 4 is a side view of the separator head shown in Figure 3;

Figure 5 is a detailed view in section of a portion of the agitating means within the separator;

Figure 6 is another detailed view in section of still a further part of the agitating means;

Figure 7:
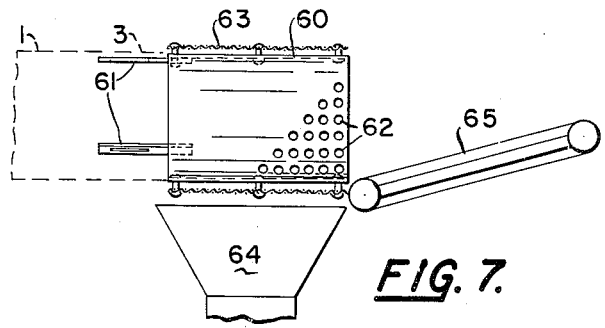
Figure 7 is a view of another form of separator head which is employed during wet operation including its attachment to the drum of the separator and the collecting means for the slime.

As is well known to those in the uranium field, uranium ore generally consists of solid coarse particles, such as gravel or rock having a coating thereabout in the form of an oxide coating or talc. The valuable uranium is contained within this coating and in dry country where there is no or very little water in the coating, it is collected in the form of dust. The principal embodiment of this invention is designed for use in such dry operations and in general the dry separator shown in Figure 1 is designed to separate the dust which carries the uranium values from the rock and gravel or coarse and hard particles and deposit same in a dust chamber or collector.

Considering Figure 1 in detail, numeral 1 represents a hollow cylindrical drum supported on its rotating drive means with its longitudinal axis slightly inclined from the horizontal whereby end 2 of the drum is slightly elevated with respect to end 3. Any suitable type of drive means for rotating the drum may be employed and, as shown, a satisfactory drive means includes an electric motor 4 mounted on a suitable support 5, a pair of gear wheels 6 mounted in spaced relation about the periphery of the drum 1 and the usual means generally represented by numeral 7 for suitably connecting through proper reduction motor 4 with gears 6 and preferably the intermediate connections 7 are designed to cause rotation of the drum at a relatively slow speed, say 12 r.p.m. At the open end 2 of the drum there is provided any type of an inlet means, such as the hopper 8, supported on sub frame 9. As shown, the hopper 8 includes a bell shaped end 10 and a hollow extension 11 communicating therewith and extending within the drum 1. At the end of this member 11 there is provided a suitable gate control 12 for the ore, which also may take various forms that are well known but which preferably is of the automatic type that closes, except when opened by the weight of the incoming ore. Although ore or the material being separated can readily be fed directly to the hopper 8 from the earth, in all probability it is desirable to employ additional feed means such as the conveyor 13 driven by the motor means 14, said conveyor being associated with an ore storage chute or bin not shown. Generally the ore fed to the hopper 8 is of the correct size for treatment, but if not a conventional crusher or grinder such as a set of rotating rolls, may be inserted between the feed bin and the hopper 8. In any event, the manner of conveying the ore to the hopper 8 forms no part of this invention, but it should be apparent from the description thus far that hopper means 8 is one suitable form of communication of the ore to the rotating drum 1.

Due to the inclination of drum 1, the ore delivered has a definite tendency to travel from end 2 to end 3, but to increase this action and to control the amount of upgrading of the ore, as will be hereinafter pointed out, there is provided a suitable means for forcing the ore through the drum. This means may take the form of an ordinary fan F having a fan blade 15 detachably keyed to shaft 16 and rotated by shaft 16 which is connected through suitable coupling 17 to the electric motor 18, the coupling being designed to drive the fan at a speed in the neighborhood of 3,000 r.p.m. Surrounding the fan F is an open ended cylindrical housing 19, one end thereof extending slightly within drum 1 and there being provided adjacent the other end a heavy screen 20 of average size mesh for eliminating any undesired particles in the air stream. The housing 19 is fixed on any suitable means, such as a connection with sub-frame 9, and is provided with a recess through which extension 11 passes. It can be appreciated that upon rotation of the fan F air is forced through the drum 1 to expedite the carrying of ore from end 2 to end 3, the blade being designed for providing maximum air flow. Numeral 21 represents an air return pipe from a dust collecting chamber 22, said air return pipe having one end 23 communicating with said chamber and the other end 24 being positioned to direct air traveling therethrough to the screen 20. The purpose of this air return pipe is to provide a somewhat air-closed circulating system, the operation of which is believed obvious when the separator is in operation.

As indicated, to increase or aid in the separation of the coating from the rock and/or gravel, there should be employed agitating means for the ore within the drum and by referring particularly to Figures 1, 2, 5 and 6 this will now be described. Mounted at spaced intervals within the drum and integral with the interior surface of the drum by welding or the like are a plurality of spokes 25 and the opposite ends of each group of spokes support box-like members 26 which form bearings for a shaft 27. Through a flexible coupling arrangement represented by numeral 28, shaft 27 is coupled for rotation with shaft 16 of the fan F and the reason for having this flexible coupling is to prevent any damage that might result if there were a rigid connection between shafts 16 and 27. By this arrangement it can be appreciated that shaft 27 is designed to rotate at a speed comparable to the fan speed and independently of the rotation of drum 1. Throughout a good portion of its longitudinal length shaft 27 is provided with a plurality of projections 29 and, as shown in Figure 5, these projections take the form of burrs which rotate at a high rate of speed. These burrs constitute one part of the agitating means and the other part consists of a plurality of pocket-like units generally represented by numeral 30, these units being mounted integrally with the interior surface 32 of the drum wall and at desired spaced intervals and being constructed to coact with burrs 29 to cause the desired agitation. Considering Figure 6 in detail, each pocket unit 30 preferably consists of oval-shaped end members 31 welded to the drum surface 32 and being divided by a partition member 33 also welded to the surface 32 and the members 31. Partition 33 has an enlarged head 34, the purpose of which is to retain any substance collected in pockets 35 within the pockets until the desired amount of rotation of the drum. The purpose of having two sets of pockets for each unit 30 is in the event reverse rotation of the drum is desired and actually, in operation, only one pocket of each unit 30 is effective. As the ore particles travel down drum 1 from end 2 to end 3, they collect within pockets 35 and are retained therein or in effect are carried to the head 34, whereupon they are released at just the correct position for being struck by burrs 29. By having a multiplicity of these pocket units 30 there is provided a continuous agitating action, as the burrs are striking some of the particles all of the time and, as explained, this breaks off or disintegrates the coating from the hard rock or gravel to provide the dust, the recovery of which is desired.

After the dust consisting of the coating and uranium particles is loosened from its rock or gravel carrier within the drum, means at the end of the drum is provided for separating the heavier or coarse particles from the dust. This is accomplished by structure including one of the three separator heads shown in Figures 1, 4 and 8. Considering the head 40 of Figure 1, it consists of a bell-shaped or conical-shaped hollow housing having its enlarged open end 41 positioned adjacent the end 3 and its reduced cylindrical end 42 positioned within a stationary pipe 43 communicating with the dust chamber 22 and supported by any suitable means such as the frame 44. Extending from the enlarged end 41 of the head 40 are a plurality of slotted bars 45 which permit the head 40 to be adjustably connected to the drum 1 by the use of any suitable attaching means such as the bolts 46. As shown, the end 41 is spaced a desired degree from the end 3 and extending from the periphery of ends 3 and 41 are circumferentially extending projections or lugs 47 over which is positioned a flexible tube 48 of rubber or other suitable material. The tube 48 is cylindrical in configuration and has a cut away portion to provide, when in place, the outlet 49 between ends 3 and 41. Actually, closure member 48 is nothing more than a regular tire covering with a cut away area and it is flexible so that it will be yieldably held in position by lugs 47, regardless of the size of the spacing between ends 3 and 41. The closure member 48 merely functions as a dust retaining hood. The purpose of outlet 49 is to permit coarse and heavy rock or other particles to leave the drum 1 and pass onto the conveyor belt 50 which is supported by any suitable means 51 and functions to carry these heavier particles constituting waste to a convenient dumping bin or the like (not shown). The dust is collected and passes within head 40, due to the air flow within drum 1. Actually, the fineness of the dust particles traveling through head 40 into pipe 43 is controlled by the taper of head 40, the size of spacing 49 and the amount of air flowing through drum 1, and this should be apparent.

In Figure 4 there is shown a separator head 52 which is substantially identical with head 40, except that the walls of the bell-shaped area are less inclined and this results in less fine dust particles traveling into pipe 43 along with the fine particles and this may be desired on occasions. Regardless of whether head 40 or head 52 is used, the dust containing the valuable particles, such as the uranium, enters chamber 22 and travels downwardly through portion 53 to gate controlled outlet 54 from whence it is delivered to a loading truck or the like (not shown). Excess air is returned through return pipe 21 and it is to be noted that the dust chamber 22 includes a baffle plate 55, insuring that the dust will travel downwardly to hopper 54.

The operation of the dry separation is believed apparent from the foregoing description, but to repeat, the agitating means consisting of pocket units 30 and burrs 29 increase the turbulence and increase the breaking up of the ore particles and the dust containing the valuable uranium is collected in chamber 22, while waste consisting of rock and gravel travels to conveyor belt 50. Depending upon the type of ore that is being treated, several elements of the device of the separator may be varied, namely, the speed of rotation of the fan F, the spacing 49 and the type of separator head. For example, you can adjust the separator head and regulate the air flow to produce the correct amount of upgrading required in the case of uranium. If the original ore has a uranium content in the neighborhood of .10 of one percent and .30 of one percent is required, then one way of accomplishing this is to increase the speed of fan F by varying the coupling 17 in a well known manner. Another way is to vary the position of the head and a third way is by combining the alterations of the head and fan speed. The shape of heads 40 and 52 or the degree of inclination of their opening walls is also extremely important in realizing a particular grade of ore.

Figure 8:
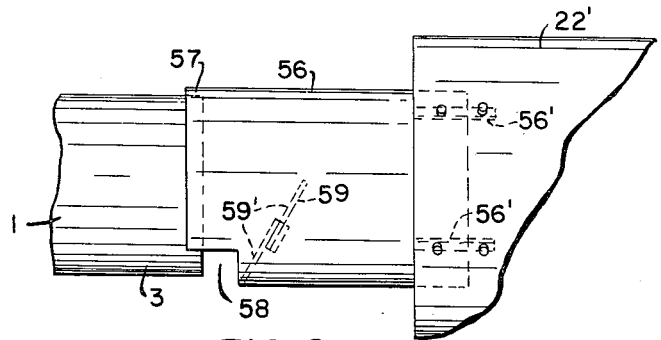
Figure 8 is another form of separator head usable in dry operation.

In place of the separator heads shown in Figures 1 and 4, there may be employed a head 56 of the type illustrated in Figure 8, this head being stationary as distinguished from rotating with the drum 1 and in direct communication with a dust collector as represented at 22'. Of course, the head 56 may be supported by any suitable frame structure such as a sub frame associated with frame 5, and in this connection it should be pointed out that throughout this description it should be assumed that suitable frame work for all of the parts is provided. Head 56 includes a cylindrical hollow body of a size slightly greater in diameter than that of drum 1. End 57 of the head is positioned over end 3 of the drum and there is provided in the end 57 over a substantial part of the head a cut away area 58 which provides the desired opening for the heavy rock and gravel. Immediately adjacent opening 58 on the side towards collector 22' is an upstanding fin 59 which may be adjusted in height by any suitable means since the fins are composed of two slidably adjustable members 59'. The fin 59 serves to return any waste material that passes beyond opening 58 back to the opening and the fineness of the dust collected within chamber 22' may be controlled in part by adjusting the height of fin 59. It should also be mentioned that the size of opening 58 may be varied by varying, through adjustment means 56', the position of end 57 about end 3 of the drum and this also varies the type of dust collected within chamber 22'.

Thus far there has only been described apparatus for separating dust or a dry operation separation, such being the most important aspect of this invention. However, the present apparatus is easily convertible for wet operation and by this is meant recovery of the valuable uranium content as a slime. This type of separation would be utilized in connection with ore found in wet country particularly and to make the conversion it is only necessary to detach the fan blade 15 and apply the separator head arrangement shown in Figure 7. Considering the wet separator head 60 of Figure 7, there is shown a cylindrical hollow body of a diameter substantially the same as that of drum 1 and this head is fitted tightly or to directly abut end 3 by means including the slotted bars 61. The periphery of cylindrical body 60 is perforated throughout with apertures of a desired size 62 and surrounding the body 60 in spaced relation is a fine screen 63, the size of the mesh of this screen depending upon the grade material wanted, a very fine screen providing high grade material. Numeral 64 represents a stationary pan for receiving the slime containing the valuable content and from the pan the slime is delivered in the usual manner to additional apparatus for further refining treatment. Waste is that portion of the slime which is of such a size as not to pass through apertures 62 or screen 63 and such waste falls on a conveyor belt 65 and it should be understood that in actuality, the drum 1, head 60 and screen 63 are slightly inclined from the horizontal as in Figure 1.

It is believed the operation of the wet separator is apparent, but briefly, assuming wet ore particles are delivered to hopper 8, additional water or liquid is supplied by any suitable means such as that shown at 66 in Figure 1 and this is to provide the proper type of slurry or slime. The slime travels downwardly through inclined drum 1 and the ends 31 tend to hold water from traveling too rapidly, thus permitting the pockets 35 to function in a manner described to throw the material against the burrs. This results in the particles in the slime being broken up into finer particles in much the same manner as the breaking up of the dust, and following this operation the slime containing the valuable ore in the form of fine particles is received in pan 64, while waste is delivered to belt conveyor 65.

From the foregoing it will be seen that this invention is one well adapted to attain all the ends and objects hereinabove set forth, together with other advantages which are obvious and which are inherent to the structure of the several embodiments. As many alterations may be made of the invention without departing from the scope thereof, it is to be understood that all matter herein set forth or shown in the accompanying drawings is to be interpreted as illustrative and not in a limiting sense.

What is claimed is:

1. A separator particularly useful for separating dust from ore materials comprising an elongated hollow drum having at least one open end, means to support said drum for rotation about a substantial horizontal axis and means to rotate said drum, ore inlet means adjacent the other end of the drum, fan means for positively forcing the ore through said drum from the inlet means to the one end, agitating means within the drum for continually agitating the ore substantially throughout its travel within the drum in order to loosen the ore into dust particles and coarse particles, said agitating means including a shaft extending longitudinally within the drum and mounted for rotation within the drum, means operably connected with said forcing means and entirely independent of said drum rotating means to rotate said shaft at a speed in excess of drum rotating speed, and a separator head unit mounted adjacent and in communication with said one end of the drum, said head unit including adjustable means for regulating the separation of the dust from the coarse particles.

2. A separator as defined in claim 1 wherein the head unit further includes a substantial bell shaped opening with the enlarged end thereof in communication and substantial alignment with the open end of the drum.

3. A separator as defined in claim 2 wherein the head unit is also provided with means extending from the enlarged end of the opening for adjustable attachment to and rotation with the drum adjacent the open end thereof, said enlarged end when attached being spaced from open end to provide a cylindrical opening and a flexible hood surrounding the opening and provided with an outlet for passage of the coarser particles.

4. A separator as defined in claim 1 wherein the head unit further includes a stationary hollow cylindrical member with one end thereof positioned over and surrounding the one end of the drum.

5. A separator as defined in claim 4 wherein the stationary member is provided with an outlet for coarse particles adjacent the one end thereof and there is also provided immediately adjacent the opening an adjustable fin for varying the separation of the particles.

6. A separator as defined in claim 1 wherein the said shaft has extending therefrom a plurality of burrs which the ore strikes.

7. A separator as defined in claim 6 wherein the agitating means further includes a plurality of units mounted on the interior surface of the drum at spaced intervals and constructed to provide ore receiving pockets for carrying the ore materials to the burrs.

8. A separator as defined in claim 7 wherein the pocket units consist of spaced members extending from the interior of the drum and having mounted therebetween a dividing member provided with an enlarged head shaped to control the departure of ore from the units.

9. A separator as defined in claim 6 wherein the means for forcing the ore through the drum comprises a fan, means including a second shaft for rotating the fan, said agitating shaft being coupled for rotating with said second shaft.

10. A separator particularly useful for separating dust from ore materials comprising an elongated hollow drum having at least one open end, means to support said drum for rotation about a substantial horizontal axis and means to rotate said drum, ore inlet means adjacent the other end of the drum, fan means for positively forcing the ore through said drum from the inlet means to the one end, agitating means within the drum for continually agitating the ore substantially throughout its travel within the drum in order to loosen the ore into dust particles and coarse particles, and a separator head unit for separating the dust and coarse particles, said agitating means comprising a shaft extending longitudinally within the drum and mounted for rotation within the drum, means operably connected with said forcing means and entirely independent of said drum rotating means to rotate said shaft at a speed in excess of drum rotating speed, said shaft having extending therefrom a plurality of burrs designed to strike the ore material.

11. A separator as defined in claim 10 wherein the agitating means further includes a plurality of units mounted on the interior surface of the drum at spaced intervals and constructed to provide ore receiving pockets for carrying the ore materials to the burrs.

12. A separator particularly useful for collecting valuable ore particles comprising an elongated hollow drum having at least one open end, means to support said drum for rotation at a predetermined speed about an axis slightly inclined from the horizontal whereby the other end is elevated with respect to the one end, agitating means within the drum for continuously agitating the ore substantially throughout its travel from the other end to the one end, said agitating means including a plurality of burrs mounted for rotation within the drum at a speed considerably in excess of said predetermined speed, said burrs being integral on a shaft extending longitudinally within the drum and mounted for rotation within the drum, means to rotate the drum and means entirely independent of said drum rotating means for rotating the shaft, said agitating means further including a plurality of pocket like members integral with the interior of the drum and spaced at predetermined intervals, said pocket members being constructed to carry the ore for agiation by the burrs, and a separator head unit mounted at the one end of the drum and in communication with the interior of the drum.

13. A separator as defined in claim 12 wherein said pocket members include two spaced apart portions and a dividing member mounted therebetween, said dividing member having an enlarged head shaped to control the departure of ore from the pockets.

14. Apparatus as defined in claim 12 wherein said head comprises a hollow cylindrical member of substantially the same size as the drum, one end of said hollow member abutting directly against the one end of the drum and said hollow member being perforated throughout its periphery for permitting travel of ore particles therethrough, there also being provided adjacent the other end of the hollow member conveyor means for collecting the ore particles that are of a size not to pass through said perforations.

15. A separator as defined in claim 14 wherein said head further includes a cylindrical screen of fine mesh spaced from and surrounding the hollow member.

16. A separator as defined in claim 12 wherein the other end of the drum also is provided with liquid inlet means and the burrs are mounted on a shaft extending along the longitudinal axis of the drum.

References Cited in the file of this patent

UNITED STATES PATENTS

| | | |
|---|---|---|
| 1,135,594 | Liggett | Apr. 13, 1915 |
| 1,402,783 | Meyer | Jan. 10, 1922 |
| 1,673,848 | Stebbins | June 19, 1928 |
| 1,981,318 | James | Nov. 20, 1934 |
| 2,546,860 | Klagsbrunn | Mar. 27, 1951 |

FOREIGN PATENTS

| | | |
|---|---|---|
| 253,356 | Great Britain | June 17, 1926 |